(12) United States Patent
Ohtaki

(10) Patent No.: US 6,289,483 B1
(45) Date of Patent: Sep. 11, 2001

(54) READ RETRY METHOD IN DISK DRIVE

(75) Inventor: Toshiyuki Ohtaki, Yamagata (JP)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/298,570

(22) Filed: Apr. 23, 1999

(30) Foreign Application Priority Data

Apr. 24, 1998 (JP) .................................................. 10-114906

(51) Int. Cl.$^7$ .................................................. H03M 13/00
(52) U.S. Cl. ............................ 714/769; 714/746; 360/53
(58) Field of Search .................... 714/769, 746; 360/53

(56) References Cited

U.S. PATENT DOCUMENTS 5,432,766 * 7/1995 Ando et al. ............................ 369/47
5,682,272 * 10/1997 Taroda et al. ......................... 360/53

* cited by examiner

Primary Examiner—Phung M. Chung
(74) Attorney, Agent, or Firm—Dilworth & Barrese, LLP

(57) ABSTRACT

A method for retrying a read operation upon detecting a read error of a disk drive is disclosed. The method includes the steps of decreasing the revolution rate of a disk until the read error is corrected; and if the read error is corrected, gradually increasing the revolution rate of the disk while a data read operation is performed.

19 Claims, 3 Drawing Sheets

READ RETRY METHOD IN DISK DRIVE

BACKGROUND OF THE INVENTION

1. Field of the Invention

The present invention relates generally to disk drives such as CD-ROM (Compact Disk-Read Only Memory) drives, and more particularly, to a method for reducing read errors when reading data with a disk drive.

2. Description of the Related Art

Since a CD-ROM drive used in a contemporary personal computer or workstation accesses data at high speed such as 16× or 24× speed, read errors are likely to occur. Such a high-speed disk drive is designed to perform read retry processing that repeatedly attempts to read upon detecting a read error. Methods for the read retry processing are as follows: (1) a general method to retry reading for a prescribed number of times under the condition that the number of disk revolutions per unit time (i.e., disk revolution rate) is maintained at a given level; (2) a temporary decelerating method for reattempting to read by decreasing the disk revolution rate if an error is not corrected by the first general method, and for returning to the original disk revolution rate if the disk drive succeeds in reading; and (3) a decelerating method for reattempting to read by decreasing the disk revolution rate if an error is not corrected by the first general method, and for maintaining the revolution rate at the decreased level if the disk drive successfully reads.

The above methods for read retry processing have respective advantages and disadvantages. The first general method exhibits low error correcting capability because the disk revolution rate is always maintained at a given level. The second temporary decelerating method is superior in error correcting capability, but increases the load on the system. That is, the revolution of a spindle motor is frequently controlled, due to a frequent abrupt increase in the disk revolution rate to return to the original revolution rate after a corresponding abrupt decrease the revolution rate to overcome an error. Furthermore, the second temporary decelerating method may damage the disk because the disk returns to the original revolution rate after an error is corrected. Typically, the disk is damaged due to the abrupt changes in the revolution speed of the disk. The damaged part of the disk may generate a read error again and therefore it becomes difficult to decipher the data in the error-prone region. In the third decelerating method, the data transmission rate is lowered because the decreased disk revolution rate is maintained after an error occurs.

SUMMARY OF THE INVENTION

It is an object of the present invention to provide a read retry method which has superior error correcting capability, and which can reduce read errors while maintaining a high data transmission rate.

According to an aspect of the present invention, there is provided a method for retrying a read operation upon detecting a read error of a disk drive, including the steps of decreasing the revolution rate of a disk until the read error is corrected; and if the read error is corrected, gradually increasing the revolution rate of the disk while a data read operation is performed.

The present invention improves error correcting capability by lowering the disk revolution rate when necessary. Once an error is corrected, the original disk revolution rate is not immediately returned to, in contrast to the conventional temporary decelerating method. Rather, the revolution rate is gradually increased in stages while a read operation is performed. Therefore, the next error can rapidly be detected before the revolution rate is significantly increased. As a result, unnecessary retrying time is diminished and the probability of generating an error reduced. Moreover, the spindle motor of the disk drive is prevented from revolving abruptly.

In an illustrative embodiment, if the disk drive succeeds in reading a prescribed number of data blocks after a read error is corrected, the disk revolution rate is gradually increased. The number of data blocks is set in accordance with the type of error detected, e.g., an ECC (Error Correction Code) error or a servo error. For the ECC error, the data blocks are set in consideration of a scratch or contamination of the disk. In the case of a servo error, the number of data blocks is set in consideration of the vibration of the disk.

The inventive read retry method can overcome an error at a maintainable maximum transmission rate because the number of revolutions of the disk is decreased in stages at the decreasing step. If a read error occurs again during the increasing step, the decreasing step is performed again. Therefore, an error can rapidly be sensed and an unnecessary retry operation omitted.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 3:
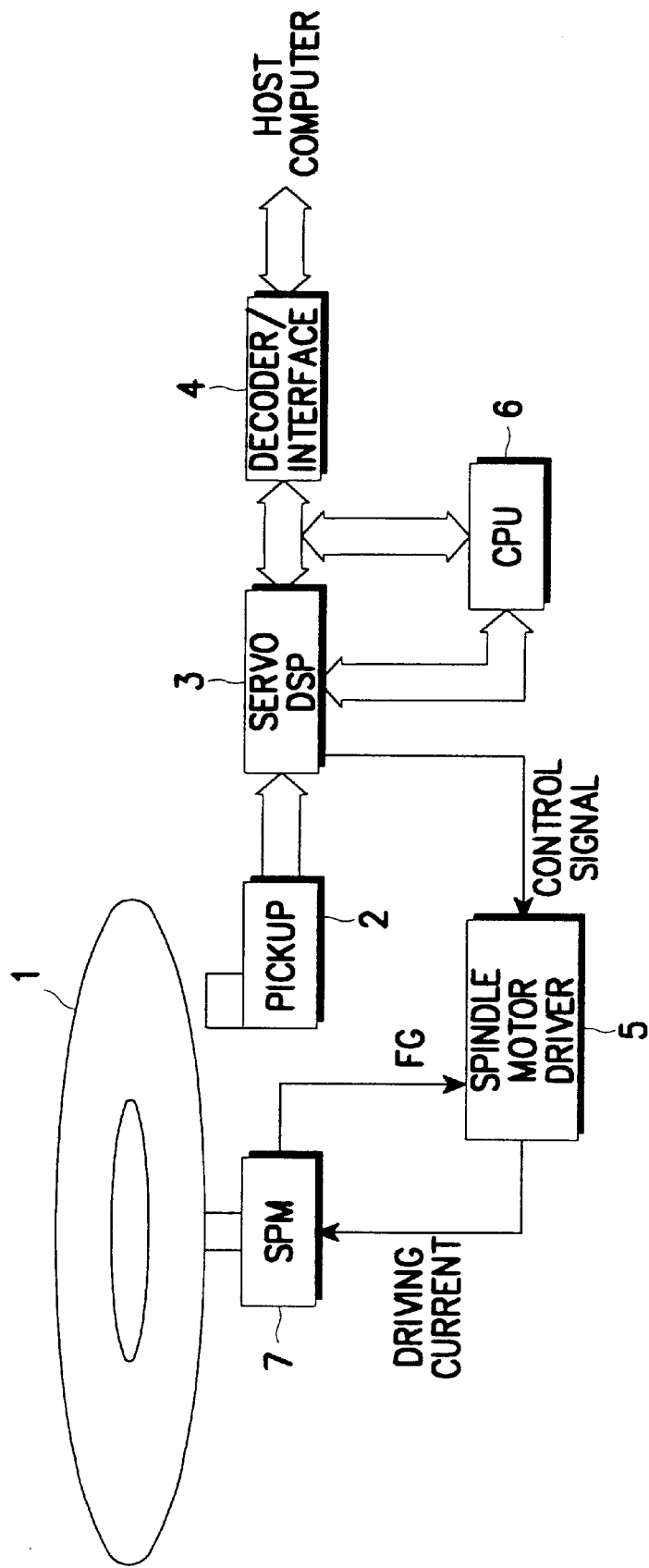
FIG. 3 is a block diagram of a disk drive in which the present invention may be embodied.

Referring to FIG. 3, in an optical disk drive such as a CD-ROM or digital versatile disk (DVD) drive, the position of a pick-up 2 is controlled by a servo DSP (digital signal processor) 3. A control signal which controls the disk revolution rate is transmitted from the servo DSP 3 to a spindle motor driver 5. The spindle motor driver 5 rotates a disk 1 at the proper number of revolutions per unit time by driving a spindle motor (SPM) 7, which is a disk motor, in response to the control signal from the servo DSP 3. Data read from the pick-up 2 is transmitted to a host computer via a decoder/interface 4. The overall operation of the servo DSP 3 is controlled by a central processing unit (CPU) 6.

Figure 1:
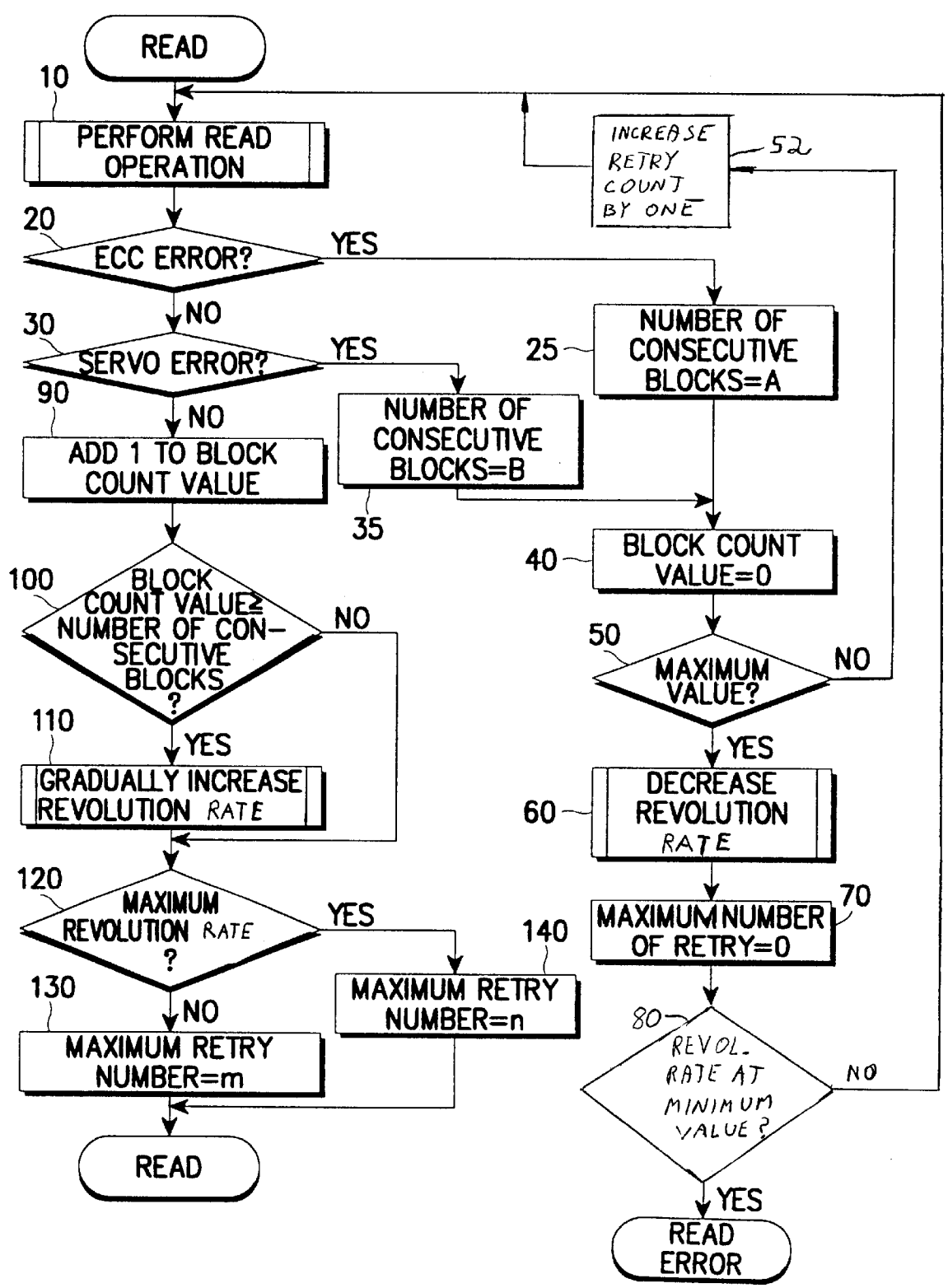
FIG. 1 is a flow chart illustrating a read retry method according to the present invention.

FIG. 1 is a flow chart illustrating an embodiment of a read retry method in accordance with the present invention. Various parameters used during the process are defined as follows: n is the number of retries in a recovery process; m is a number less than n, and in the range of one to five; A is a set number of data blocks corresponding to a scratch or contamination area of a disk, and B is a set number of data blocks corresponding to a servo error. That is, in the case of a servo error, a read success interval corresponding to B blocks is set by considering how many consecutive data block errors are caused by a typical vibration. It is noted here that when a disk rotates at a certain rotational speed of the spindle motor, the outer circumference of the disk is moving faster than the central portion of the disk. Hence, when setting an appropriate value for the parameter B considering the effect of vibrations, this fact should be taken into account.

The read retry procedure begins in step 10, where a read operation is performed at the latest disk revolution rate. Initially, the latest revolution rate is typically a maximum rate. A "retry count" representing the number of retries at the maximum rate is initially set to zero. Also, an initial value of the maximum number of retries is set to n. As data is read from the disk, CPU 6 determines if a read error has occurred at steps 20 and 30. If an ECC (error correction code) error is determined to have occurred at step 20, the routine proceeds to step 25 where a number of consecutive data blocks (which is used as a threshold for a subsequent successful read determination) is set to the parameter A. If, at step 30, it is determined that a servo error has occurred (typically causing vibration of the disk), the number of consecutive data blocks is set to the parameter B at step 35. If the number of consecutive blocks is set to A or B, a block count value is set to "0" at step 40.

Next, the number of retries that have been performed, which corresponds to the retry count, is checked at step 50. If the number of retries is less than the set maximum value (n), the CPU 6 increases the retry count by one at step 52, and then returns to step 10 to perform a retry operation (a recovery process) by the conventional first general retry method. That is, another read attempt is made at the same disk revolution rate as the previous read attempt. On the other hand, if the number of retries equals the maximum value at step 50, the revolution rate of the spindle motor 7 is decreased by one stage at step 60. The maximum number of retries is set to "0" at step 70. By setting this maximum number to zero, the next retry operation at the decreased revolution rate will be performed only once, since a "YES" answer will subsequently result in step 50. That is, multiple retries at each incrementally reduced revolution rate are not attempted. (In alternative embodiments, each retry operation at a decreased revolution rate can be performed two or more times.) However, if in step 80 it is determined that the revolution rate of the spindle motor 7 has reached a minimum value (or is unchanged from its previous rate if the previous rate cannot be reduced any further) that status is designated to be a read error. Conversely, if the number of revolutions of the spindle motor 7 can be decreased, the CPU 6 returns to step 10 to perform the retry operation at the incrementally decreased revolution rate. It is noted here that the stages (decrements) by which the revolution rate is decreased need not be uniform. For instance, the first decrement may be from 24× to 16×, with subsequent decrements being units of 4×.

Thus, if a read error is initially detected, the CPU 6 first retries the read operation by n times at the initial revolution rate. If the read error is not corrected, the CPU 6 performs the read retry operation while gradually decreasing the revolution rate of the spindle motor 7 (a decelerating process). If it is impossible to perform a satisfactory read operation, in spite of the fact that the revolution rate of the spindle motor 7 has decreased to a minimum value, that status is designated as a read error. If the CPU 6 successfully reads (e.g., if it performs error-free reading from one data block or reading with an acceptable low number of errors from that data block) it continues to perform a read operation. Hence, even though there is an error due to a scratch, contamination or vibration of the disk 1, a read operation can be performed at the maximum readable revolution rate by virtue of the gradual reduction in the spindle motor revolution rate.

If a read error is corrected by the above steps, the CPU 6 adds "1" to a block count value at step 90. The block count value is compared at step 100 with the number of consecutive blocks A or B previously set in step 25 or 35. That is, an interval which is concluded to be successful in reading after a read error is corrected is checked according to the error type (ECC or servo error). If the CPU 6 succeeds in reading during the number of consecutive blocks which is set according to the error type, it is decided that there is a low probability of generating consecutive errors. In other words, if the block count value is greater than or equal to the number of consecutive blocks, the revolution rate of the spindle motor 7 is gradually increased at step 110. (The gradual increase can be on an incremental basis, with a read operation attempted at each incrementally increased revolution rate.) It is then checked at step 120 whether the revolution rate of the spindle motor 7 has reached a maximum value. If so, the maximum number of retries is reset to the parameter n at step 140. If the revolution rate is below the maximum value, the maximum number of retries is set to the parameter m, which is less than n, to continue to perform a read operation. By setting the maximum number of retries to m, rather than n, faster processing speed is achieved. Namely, if an error occurs again while the revolution rate of the spindle motor 7 is increased, it is due largely to the same error type as the previous one. Hence, it is preferable to reduce the number of retries during the recovery process at the gradually increased rotation rate, so as to quickly return to the deceleration process if necessary.

Accordingly, through steps 90 to 140, if a read operation is successfully carried out after an error is detected, the revolution rate of the spindle motor 7 is gradually increased. If an error occurs again, a read operation can be performed by rapidly decreasing the revolution rate of the spindle motor 7 to that when the previous error was corrected, and even further if necessary. Moreover, the spindle motor 7 can gradually return to its maximum revolution rate.

Figure 2A:
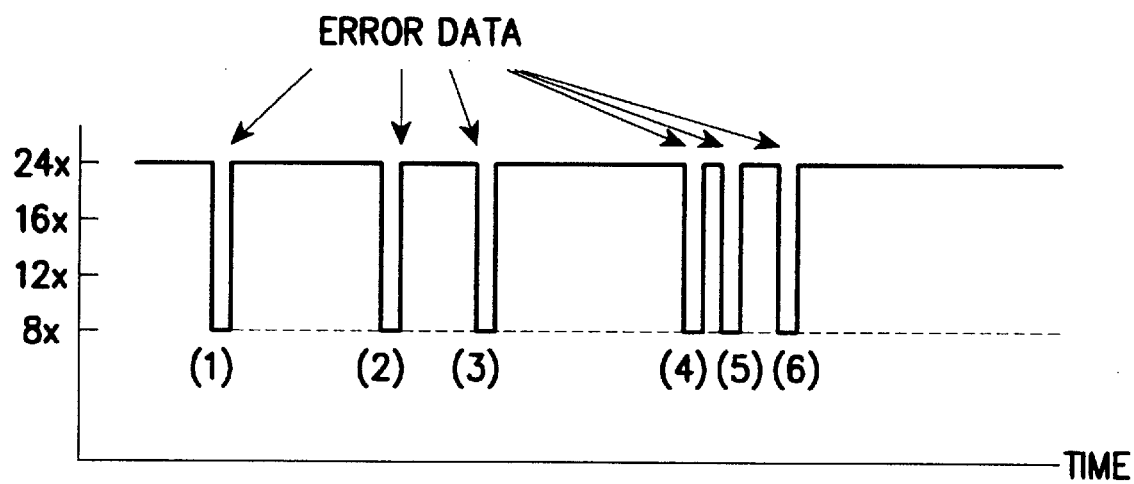
FIG. 2A is a diagram showing variations in the revolution rate of a spindle motor upon detecting an error according to the prior art.
Figure 2B:
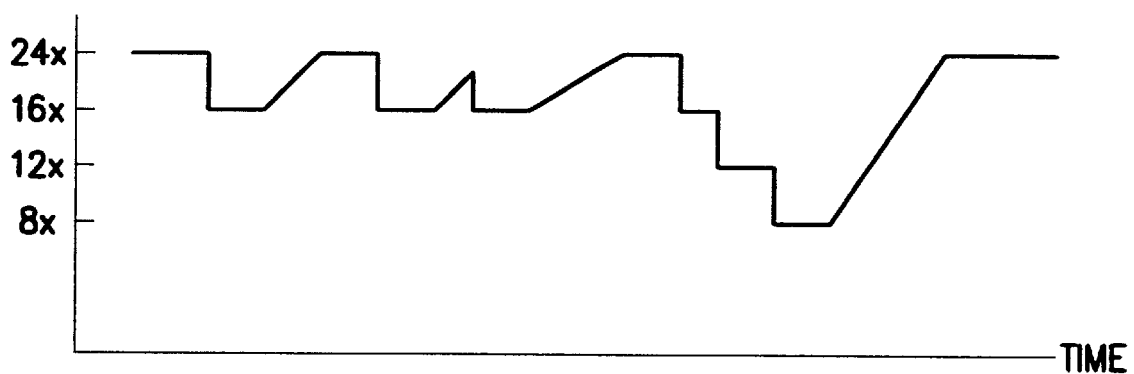
FIG. 2B is a diagram showing variations in the revolution rate of a spindle motor upon detecting an error according to the present invention.

Variations in the revolution rate of the spindle motor 7 upon detecting an error are shown in FIGS. 2A and 2B. FIG. 2A shows variations in the revolution rate controlled by the conventional second and third decelerating methods; FIG. 2B shows exemplary variations in the revolution rate according to the present invention.

Referring to FIG. 2A, when there are errors at points (1) to (6), the revolution rate of the spindle motor 7 controlled by the conventional second temporary decelerating method shifts between 8× speed and 24× speed as indicated by a solid line. In the conventional third decelerating method, 8× speed is maintained after the number of revolutions is decreased from 10 24× speed to 8× speed as indicated by a dotted line.

Referring to FIG. 2B, the revolution rate of the spindle motor 7 is decreased from 24× speed to 16× speed upon detecting an error at the point (1), and successful reading occurs at 16× speed. Thereafter, since a stable read operation has been attained, the revolution rate is gradually increased to 24× speed. When an error occurs at the point (2), the revolution rate is decreased to 16× speed again. Thereafter, since an error is detected while the revolution rate is gradually increased, the rate is again decreased to 16× speed. At points (4), (5) and (6), the rate is reduced in stages. That is, the revolution rate is reduced to 16× speed at point (4), to 12× speed at point (5), and to 8× speed at point (6).

Whether or not a stable read operation is achieved is determined in accordance with the number A or B of consecutive blocks, set according to the error type.

When comparing variations in the revolution rate of the spindle motor 7, the conventional second temporary decelerating method affords fast speed, but the difference between the increased and decreased revolution rates is large. Therefore, it is difficult to achieve a stable read operation. However, in the present invention, a stable read operation can be obtained by suppressing the differences between the increased and decreased revolution rates. Further, since a retry operation is repeated at the same revolution rate upon detecting an error, a high transmission rate can be maintained in comparison with the conventional second temporary decelerating method. Although the conventional third decelerating method can perform a stable read operation since the number of revolution rate is maintained at 8× speed after an error is generated, the overall speed at which data is read is diminished. Consequently, the read retry method according to the present invention is superior.

The inventive read retry method can reduce data read errors since there is no need to abruptly change the revolution rate of the spindle motor on a frequent basis. A read operation can be performed at a maintainable maximum transmission rate by decreasing the revolution rate of the spindle motor in stages. Since the spindle motor is gradually accelerated, an error can rapidly be sensed. Therefore, the occurrence of unnecessary retry operations is reduced, and the overall data transmission rate is improved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for retrying a read operation upon detecting a read error of a disk drive, comprising the steps of:
    decreasing a revolution rate of a disk until the read error is corrected; and
    if the read error is corrected, gradually increasing the revolution rate of the disk while a data read operation is performed.

2. The method as claimed in claim 1, wherein said gradually increasing step increases the revolution rate of the disk if the disk drive successfully reads a prescribed number of consecutive data blocks after the read error is corrected.

3. The method as claimed in claim 2, wherein the prescribed number of data blocks is set according to an error type of the read error.

4. The method as claimed in claim 3, wherein said error type is selected from the group consisting of an error correction code (ECC) error and a servo error.

5. The method as claimed in claim 1, wherein said decreasing step decreases the revolution rate of the disk in stages, with a read operation being attempted at each decreased revolution rate until the read error is corrected.

6. The method as claimed in claim 5, wherein the read operation at each decreased revolution rate is attempted only once, without a retry operation.

7. The method as claimed in claim 5, wherein the read operation at each decreased revolution rate is attempted at least two times before decreasing the revolution rate further.

8. The method as claimed in claim 5, wherein said stages are non-uniform.

9. The method as claimed in claim 1, wherein said decreasing step is performed again if another read error occurs at said increasing step.

10. The method as claimed in claim 1, further comprising the step of, prior to said decreasing step, performing a recovery step by retrying a read operation for a prescribed number of times while maintaining the revolution rate at its current rate.

11. The method as claimed in claim 10, wherein said recovery step is performed if another read error occurs at said increasing step.

12. The method as claimed in claim 11, wherein the prescribed number of times, m, of read retries performed during said increasing step, is less than the prescribed number of times, n, that read retries are performed prior to said decreasing step.

13. A method for retrying a read operation upon detecting a read error of a disk drive, comprising the steps of:
    a) incrementally decreasing a revolution rate of a disk until the read error is corrected, with a read attempt being performed at each incrementally decreased revolution rate until a revolution rate is arrived at in which the error is corrected;
    b) if the read error is corrected, gradually increasing the revolution rate of the disk while a data read operation is performed; and,
    c) returning to step a) if another read error occurs at said increasing step.

14. The method as claimed in claim 13, wherein in step (b), the revolution rate of the disk is increased if the disk drive successfully reads a prescribed number of consecutive data blocks after the read error is corrected.

15. The method as claimed in claim 14, wherein the prescribed number of data blocks is set according to an error type of the read error.

16. The method as claimed in claim 15, wherein said error type is selected from the group consisting of an error correction code (ECC) error and a servo error.

17. The method as claimed in claim 13, further comprising the step of, prior to step (a), performing a recovery step by retrying a read operation for a prescribed number of times while maintaining the revolution rate at its current rate.

18. The method as claimed in claim 17, wherein said recovery step is performed if another read error occurs at said increasing step.

19. The method as claimed in claim 18, wherein the prescribed number of times, m, of read retries performed during said increasing step, is less than the prescribed number of times, n, that read retries are performed prior to said decreasing step.

* * * * *